United States Patent
Vom Stein

(10) Patent No.: US 8,550,779 B2
(45) Date of Patent: Oct. 8, 2013

(54) ASSEMBLY FOR SEALING A ROLLER BEARING

(75) Inventor: Hans-Joachim Vom Stein, Odenthal (DE)

(73) Assignee: Aktiebolaget SKF, Göteborg (SE)

(*) Notice: Subject to any disclaimer, the term of this patent is extended or adjusted under 35 U.S.C. 154(b) by 640 days.

(21) Appl. No.: 12/682,429

(22) PCT Filed: Oct. 7, 2008

(86) PCT No.: PCT/EP2008/008432
§ 371 (c)(1),
(2), (4) Date: Aug. 17, 2010

(87) PCT Pub. No.: WO2009/049788
PCT Pub. Date: Apr. 23, 2009

(65) Prior Publication Data
US 2010/0303633 A1    Dec. 2, 2010

(30) Foreign Application Priority Data
Oct. 9, 2007  (DE) .................. 10 2007 048 557

(51) Int. Cl.
*F04D 29/08* (2006.01)
*B03C 3/41* (2006.01)
*F01D 25/16* (2006.01)

(52) U.S. Cl.
USPC ................ 416/174; 415/229; 96/97

(58) Field of Classification Search
USPC ........ 415/229; 416/174, 93 R; 313/309, 351; 96/97, 97 R
See application file for complete search history.

(56) References Cited

U.S. PATENT DOCUMENTS

| | | | | |
|---|---|---|---|---|
| 1,699,949 A * | 1/1929 | Bucklen | .................... | 290/55 |
| 4,364,752 A * | 12/1982 | Fitch et al. | .................... | 96/64 |
| 6,032,406 A * | 3/2000 | Howse et al. | .................... | 43/114 |
| 6,357,923 B1 | 3/2002 | Sato et al. | | |
| 2005/0194583 A1* | 9/2005 | Taylor et al. | .................... | 257/10 |
| 2007/0151448 A1* | 7/2007 | Taylor et al. | .................... | 95/57 |

FOREIGN PATENT DOCUMENTS

| | | |
|---|---|---|
| CN | 200963362 Y | 10/2007 |
| CN | 201015748 Y | 2/2008 |
| EP | 0892471 A2 | 1/1999 |
| EP | 0936368 A2 | 8/1999 |
| EP | 1760343 A1 | 3/2007 |
| GB | 2348468 A | 10/2000 |

* cited by examiner

*Primary Examiner* — Nathaniel Wiehe
*Assistant Examiner* — Aaron Jagoda
(74) *Attorney, Agent, or Firm* — Bryan Peckjian; SKF USA Inc. Patent Department

(57) ABSTRACT

An assembly for sealing an inlet into a to-be-sealed space, comprising the following features: at least one charging electrode that is connectable to one pole of a high voltage source is disposed in a first area of the inlet, an opposing electrode is disposed in a second area of the inlet that lies opposite of the first area, and the electrodes are disposed in a manner aligned with each other such that an influencing zone, which is formed between the electrodes, acts on influencible particles that penetrate from the outside in the direction towards the to-be-sealed space, such that these particles are accelerated in the direction away from the to-be-sealed space.

20 Claims, 1 Drawing Sheet

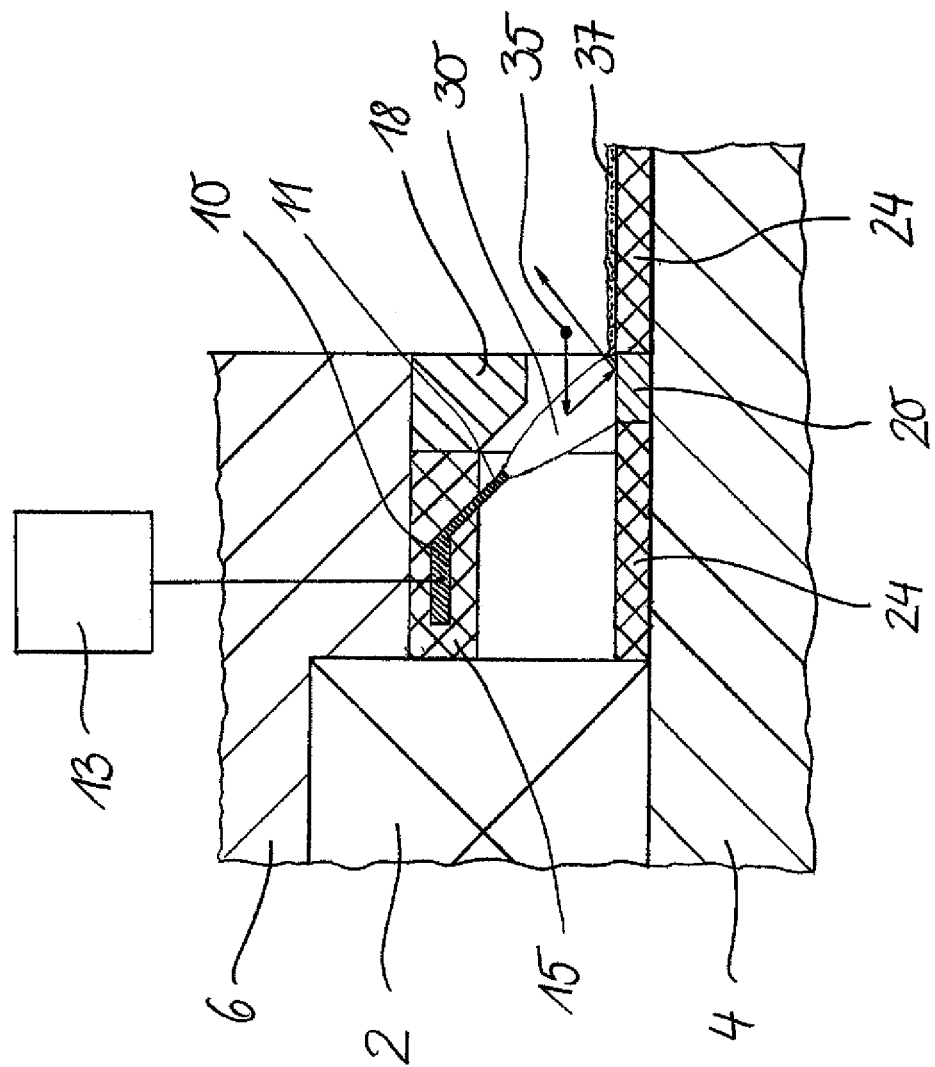

ASSEMBLY FOR SEALING A ROLLER BEARING

CROSS-REFERENCE

This application is the U.S. national stage filing of International Application No. PCT/EP2008/008432 filed Oct. 7, 2008, which claims priority to German patent application no. 10 2007 048 557.5 filed Oct. 9, 2007.

TECHNICAL FIELD

The invention concerns an assembly for sealing an inlet into a to-be-sealed space.

RELATED ART

In the art, elements or constructions that have the object of preventing and/or to limiting undesired material transfers from one space into another space are identified as seals. In addition, one differentiates very generally into contacting seals and contact-less seals. For example, in roller bearings, seals are utilized to protect the roller bearing against the influx of solid materials such as dust and/or liquids such as water. For this purpose, the seals operate between an intentionally stationary and a moving part of the roller bearing.

SUMMARY

It is an object of the present invention to provide an improved assembly for sealing.

In one aspect of the present teachings, an assembly for sealing an inlet into a to-be-sealed space comprises the following features:

at least one charging electrode connectable to one pole of a high voltage source and disposed in a first area of the inlet, an opposing electrode disposed in a second area of the inlet that lies opposite of the first area, and the electrodes are disposed in a manner aligned with to each other such that an influencing zone, which is formed between the electrodes, acts on influencible particles that penetrate from the outside in the direction towards the to-be-sealed space, such that these particles are accelerated in the direction away from the to-be-sealed space.

With the above-described assembly, a completely new type of seal is provided that advantageously operates in a contact-free manner and simultaneously ensures a level of sealing tightness that was previously known only in sliding seals, however without the accompanying abrasion or wear. The assembly thus combines the advantages of previously known contact-less and sliding seals. In a further advantage, an electrical power output of only a few Watts is necessary to operate the assembly.

So that the influenced particles are accelerated in the direction away from the to-be-sealed space, in an advantageous embodiment, the two electrodes are offset relative to each other in the direction from the outside inward to the to-be-sealed space, such that the influencing zone exhibits an inclination relative to said direction, wherein, in particular, the opposing electrode is disposed in front of the charging electrode as viewed from the outside inward. In particular, the charging electrode is formed as a corona charging electrode and a plurality of charging electrodes are provided, wherein each is formed with a tip projecting into the inlet, and in particular, the tips are formed and disposed with said inclination.

The high sealing tightness is achieved, in essence, by forming a plasma channel in the electric field from the opposing electrode to the charging electrode in the sense of a hard corona charging, with which charging, namely, electrons are transported from the particles to the charging electrode. The particles influenced in this manner are attracted a short distance by the opposing electrode and are impinged there. In so far as it concerns liquid particles, they adhesively cling there, forming a liquid film. Thus, if portions of the inlet adjoining the opposing electrode are formed with an inclination, the liquid condensing on the opposing electrode during operation of the assembly is directed away from the opposing electrode into a specifiable target area. If the particles are particles in an essentially dry environment, then they are exhausted out of the to-be-sealed space away from the inlet.

In an advantageous embodiment, a plurality of charging electrodes formed as corona charging electrodes are provided, of which each is designed with an extension formed as a tip, and the tips are disposed so that their paraboloid-shaped influencing zones completely cover the inlet as much as possible. Thus, no open space is permitted to remain between the individual influencing zones of the individual extensions and/or tips.

Further advantages, features and details of the invention result from the exemplary embodiment of the invention described in the following with the assistance of the FIGURE.

BRIEF DESCRIPTION OF THE DRAWING

The sole FIGURE shows a representative sealing assembly according to the present teachings.

DETAILED DESCRIPTION OF THE INVENTION

As an exemplary embodiment of the invention, the FIGURE shows a cross-sectional longitudinal section in the area of a main bearing of a rotor main shaft 4 of a wind turbine. The main bearing comprises a roller bearing 2 that is disposed between the rotor main shaft 4 and a housing 6 for rotatably supporting the rotor main shaft 4 relative to the housing 6 of the wind turbine. The roller bearing 2 is protected against contaminates, which want to penetrate into the roller bearing 2 from the outside, by a sealing assembly on at least one of its end sides.

The sealing assembly comprises a support ring 15 formed from an electrically-insulating material, in particular polyurethane or liquid silicone; a plurality of corona charging electrodes 10 are disposed in the support ring 15, distributed in the circumferential direction. The corona charging electrode 10 depicted in the FIGURE comprises a tip 11 that projects obliquely towards the outside from the support ring 15 at the right portion of the inner surface of the support ring 15. Each of the corona charging electrodes 10 is connected with the positive pole of a high-voltage DC-source 13 via a not-illustrated, high-ohmic resistor, e.g., integrated into the support ring 15 that is provided for each corona charging electrode 10. The high voltage is preferably selected in a range between 3 to 12 kV.

The illustrated corona charging electrode 10 is disposed obliquely and lies opposing a ring-like opposing electrode 20, wherein the opposing electrode 20 is grounded via the rotor main shaft 4, which is formed, e.g., from steel. Insulating rings 24 are disposed on the rotor main shaft 4 in an adjoining manner at both end sides of the opposing electrode 20, which is formed in the ring-like manner.

The opposing electrode 20 is disposed axially farther outward relative to the corona charging electrodes 20, so that an obliquely-inclined influencing zone 30 results between the corona charging electrodes 10 and the opposing electrode 20. This has the effect that liquid and/or solid particles 35 penetrating from the outside in the direction of the roller bearing 2 are influenced and are accelerated en masse toward the opposing electrode 20. After the particles 35 impinge on the opposing electrode 20, they are discharged and, as is indicated with arrows for the depicted particle 35, are either held by adhesion by a liquid film forming there in the case of liquid particles 35 or are discharged against the accelerating direction or are exhausted by the effect of the impulse in the case of a completely-dry environment. In other words, one can also say that differently-formed plasma tubes form between the electrodes 10 and 20 under certain conditions according to the voltage and thus it can also be referred to a type of blow direction and/or of an ion wind arising between the electrodes 10 and 20, which generates a turbulent flow that acts like a barrier.

So that the individual corona charging electrodes 10 with their respective influencing zones achieve the gap-less influencing zone 30 as viewed inwardly from the outside, a protection ring 18 is attached upstream of the support ring 15, which protection ring 18 is likewise made of polyurethane or liquid silicone and has a smaller inner diameter than the ends of the tips 11 of the corona charging electrodes 10.

With the above-described sealing assembly, especially high requirements for the seal, e.g., against dust and moisture, are advantageously achievable. The use of the above-described sealing assembly is in no way limited to the use in wind turbines and/or roller bearings. Naturally, a use is also advantageous in non-ring-shaped, e.g., straight, seal gaps.

REFERENCE NUMBER LIST

2 Roller Bearing
4 Rotor Main Shaft
6 Housing
10 Corona charging electrode
11 Tips
13 High-voltage DC source
15 Support ring
18 Protection ring
20 Opposing electrode
24 Insulating ring
30 Influencing zone
35 Particle
37 Liquid film

The invention claimed is:

1. An assembly for sealing an inlet into a to-be-sealed space, comprising:
at least one charging electrode connectable to one pole of a high voltage source and aligned with a first radial side of the inlet, and
an opposing electrode aligned with a second radial side of the inlet that lies opposite of the first radial side, the at least one charging electrode being inclined with respect to the opposing electrode,
wherein the at least one charging electrode and the opposing electrode are aligned with each other such that, when the pole of the high voltage source is connected to the at least one charging electrode, an influencing zone spanning the inlet between the first and second radial sides is formed between the at least one charging electrode and the opposing electrode in which influencible particles are accelerated in a direction away from the to-be-sealed space and in a direction perpendicular thereto, the influencing zone being configured to form an inclined barrier in the inlet configured to prevent matter from traversing the inlet in a direction toward the to-be-sealed space from an outside.

2. The assembly according to claim 1, wherein the at least one charging electrode and the opposing electrode are axially offset relative to each other such that the opposing electrode is farther away from the to-be-sealed space than is the at least one charging electrode, wherein the influencing zone extends away from the to-be-sealed region as proceeding from the at least one charging electrode towards the opposing electrode.

3. The assembly according to claim 2, wherein the opposing electrode is disposed in front of the charging electrode as viewed in the direction extending towards the to-be-sealed space from the outside.

4. The assembly according to claim 1, wherein the charging electrode comprises a corona charging electrode.

5. The assembly according to claim 1, wherein the charging electrode comprises an extension projecting into the inlet.

6. The assembly according to claim 5, wherein the extension is formed as a tip.

7. The assembly according to claim 1, further comprising a plurality of charging electrodes including the at least one charging electrode.

8. The assembly according to claim 7, wherein each of the plurality of charging electrodes is associated with one influencing zone and the plurality of charging electrodes are disposed such that the influencing zones of the plurality of charging electrodes together completely cover the inlet.

9. The assembly according to claim 8, wherein, for the complete coverage, the charging electrodes are disposed in an inward pocket adjacent an inlet boundary that is set back approximately perpendicular to the direction extending towards the to-be-sealed space from the outside.

10. The assembly according to claim 7, wherein the plurality of charging electrodes are connected with a positive pole of a high-voltage DC source.

11. The assembly according to claim 10, wherein a voltage of the high-voltage DC source is about between 3 to 12 kV.

12. The assembly according to claim 1, further comprising electrically-insulating surface areas adjoining a surface area of the opposing electrode that lies opposite of the charging electrode.

13. The assembly according to claim 1, wherein the opposing electrode is grounded.

14. The assembly according to claim 1, wherein the opposing electrode, at least portions of the inlet, or both the opposing electrode and the at least portions of the inlet, are disposed such that the particles accelerated towards the opposing electrode are directed away into a specifiable target area.

15. The assembly according to claim 1, wherein the inlet is ring-shaped, and wherein the influencible zone extends radially across the inlet and axially away from the to-be-sealed space.

16. The assembly according to claim 15, wherein the charging electrode comprises a plurality of corona charging electrodes having tips inclined relative to the direction extending towards the to-be-sealed space from the outside, the corona charging electrodes being electrically connected to the high voltage source, the high voltage source operating at a voltage of between about 3 to 12 kV, wherein the corona charging electrodes are offset relative to the opposing electrode as viewed in the direction extending towards the to-be-sealed space from the outside, such that respective influencing zones are inclined relative to said direction and such that the opposing electrode is disposed in front of the charging electrode as viewed in the direction extending inwardly from the outside, the opposing electrode being grounded.

17. A wind turbine comprising:
a rotor main shaft,
a roller bearing rotatably supporting the rotor main shaft, and
the assembly of claim 16 sealing the roller bearing from an outside environment.

18. The assembly according to claim 1, wherein the opposing electrode is rotatable relative to the at least one charging electrode.

19. A device for sealing a ring-shaped inlet into an interior space from an outside environment, comprising:
at least one charging electrode disposed in or adjacent the inlet and aligned with a first radial side of the inlet, and
at least one opposing electrode disposed in or adjacent the inlet and aligned with a second radial side of the inlet, the second radial side being substantially opposite of the first radial side, wherein the at least one charging electrode is inclined relative to the at least one opposing electrode, and wherein the at least one charging electrode and the at least one opposing electrode are arranged relative to each other such that, when a power source is connected to the at least one charging electrode, an electric field is generated between the at least one charging electrode and the at least one opposing electrode and forms an inclined particle barrier extending radially across the ring-shaped inlet and axially away from the interior space that at least substantially blocks contaminates from an outside environment from entering into the interior space.

20. An apparatus, comprising:
a housing,
a shaft disposed at least partially in the housing and rotatable with respect thereto, an annular inlet being defined radially between the housing and the shaft,
a bearing coupled with the housing and supporting the shaft,
at least one charging electrode coupled with the housing, the at least one charging electrode extending radially into the annular inlet and being at least partially inclined axially away from the bearing,
an opposing electrode coupled with the shaft and rotatable therewith, the at least one charging electrode being disposed axially between the opposing electrode and the bearing such that, when a power source is connected to the at least one charging electrode, an influencing zone is formed in which influencible particles are accelerated in a direction from the at least one charging electrode toward the opposing electrode, so as to substantially block matter from proceeding past the influencing zone towards the bearing.

* * * * *